(12) United States Patent
Kishii et al.

(10) Patent No.: US 8,200,000 B2
(45) Date of Patent: Jun. 12, 2012

(54) MICROBEAD AUTOMATIC RECOGNITION METHOD AND MICROBEAD

(75) Inventors: Noriyuki Kishii, Kanagawa (JP); Mari Ichimura, Kanagawa (JP); Kenzo Machida, Tokyo (JP)

(73) Assignee: Sony Corporation, Tokyo (JP)

( * ) Notice: Subject to any disclaimer, the term of this patent is extended or adjusted under 35 U.S.C. 154(b) by 447 days.

(21) Appl. No.: 12/432,121

(22) Filed: Apr. 29, 2009

(65) Prior Publication Data

US 2009/0279787 A1     Nov. 12, 2009

(30) Foreign Application Priority Data

May 8, 2008 (JP) ................................. 2008-121849

(51) Int. Cl.
*G06K 9/00* (2006.01)
(52) U.S. Cl. ........ 382/141; 382/195; 73/61.75; 436/518
(58) Field of Classification Search .................. 382/141, 382/195; 436/518; 73/61.75
See application file for complete search history.

(56) References Cited

U.S. PATENT DOCUMENTS

| | | | | |
|---|---|---|---|---|
| 5,291,564 A | * | 3/1994 | Shah et al. ................. | 382/291 |
| 5,446,801 A | * | 8/1995 | Itsuzaki et al. ............. | 382/141 |
| 6,137,528 A | * | 10/2000 | Ashizaki ..................... | 348/86 |
| 6,278,482 B1 | * | 8/2001 | Ashizaki ..................... | 348/86 |
| 7,163,744 B2 | * | 1/2007 | Nightingale et al. ........ | 428/397 |
| 2002/0084329 A1 | | 7/2002 | Kaye et al. | |
| 2003/0175316 A1 | | 9/2003 | Pate et al. | |
| 2005/0129454 A1 | | 6/2005 | Nightingale et al. | |

FOREIGN PATENT DOCUMENTS

| | | |
|---|---|---|
| JP | 07-110217 | 4/1995 |
| JP | 2003-139773 A | 5/2003 |
| JP | 3468750 | 9/2003 |
| JP | 2003-287535 A | 10/2003 |
| JP | 2003-346129 A | 12/2003 |
| JP | 2005-049342 A | 2/2005 |
| JP | 2005-083994 A | 3/2005 |
| JP | 2005-526755 A | 9/2005 |
| JP | 2007-079781 A | 3/2007 |

OTHER PUBLICATIONS

Daniel C. Pregibon et al., "Multifunctional Encoded Particles for High-Throughput Biomolecule Analysis," *SCIENCE*, Mar. 9, 2007, pp. 1393-1396 vol. 315, 9,www.sciencemag.org.

* cited by examiner

*Primary Examiner* — Tarifur Chowdhury
*Assistant Examiner* — Isiaka Akanbi
(74) *Attorney, Agent, or Firm* — Wolf, Greenfield & Sacks, P.C.

(57) ABSTRACT

A microbead automatic recognition method includes the steps of: acquiring an image of a circular surface of a cylindrical microbead having a recognition pattern created on the circular surface and a plurality of reference points also created on the circular surface; and acquiring information on the rear/front and/or orientation of the cylindrical microbead from the acquired image on the basis of the positions of the reference points.

13 Claims, 5 Drawing Sheets

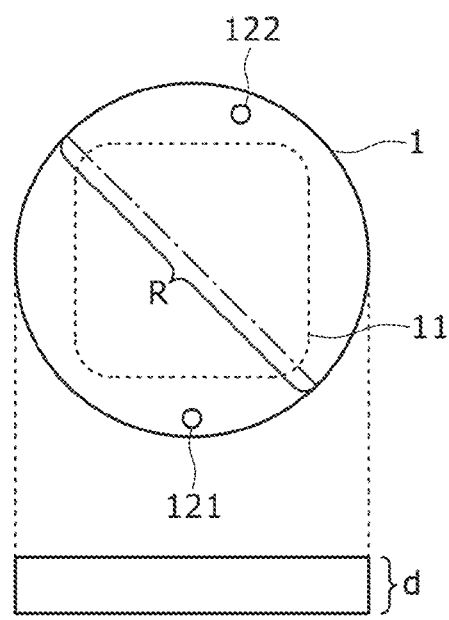
FIG.1A
FIG.1B
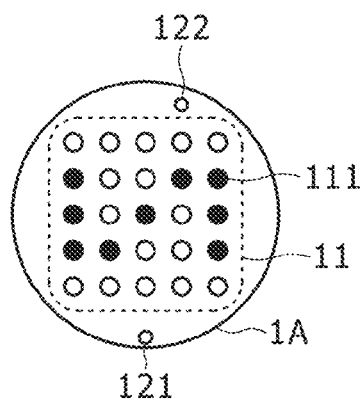
FIG.2A
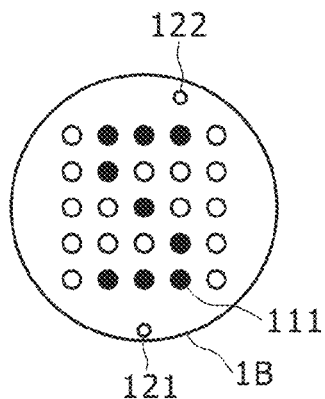
FIG.2B
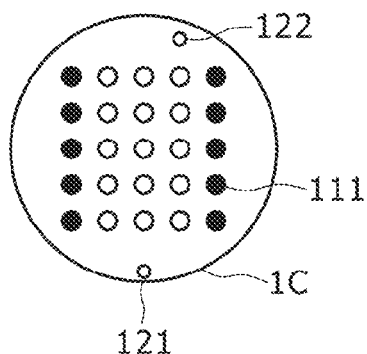
FIG.2C

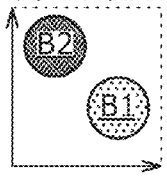
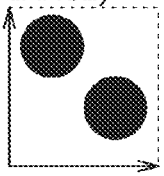
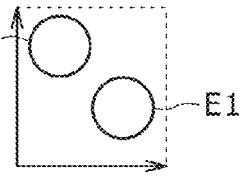
FIG.7A S1 (ACQUIRE CIRCULAR-SURFACE IMAGE)  FIG.7B S2 (DIGITALIZE IMAGE)  FIG.7C S3 (EXTRACT EDGE)
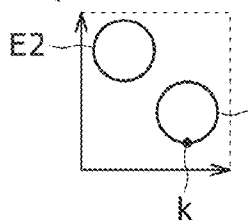
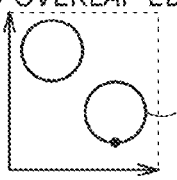
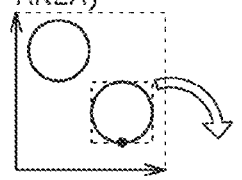
FIG.7D S4 (DETECT ORIGIN)  FIG.7E S5 (LAY STANDARD CIRCLE TO OVERLAP EDGE)  FIG.7F S6 (EXTRACT WORK AREA)
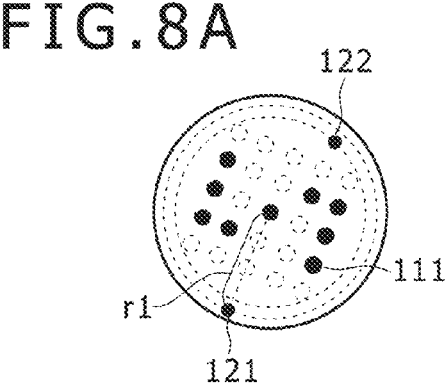
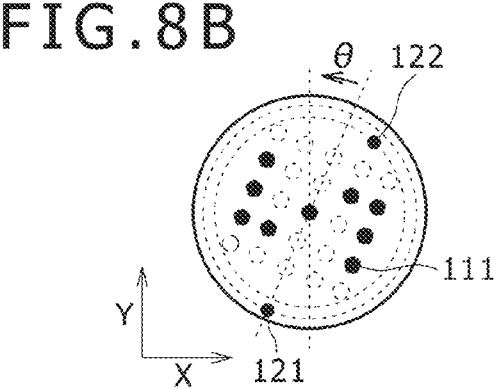
FIG.8A  FIG.8B
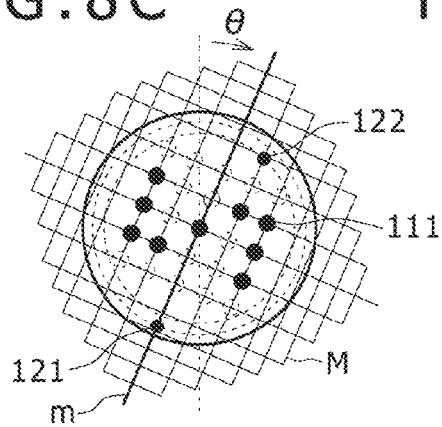
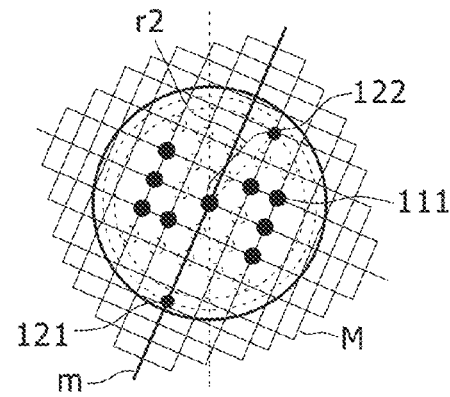
FIG.8C  FIG.8D

MICROBEAD AUTOMATIC RECOGNITION METHOD AND MICROBEAD

BACKGROUND OF THE INVENTION

1. Field of the Invention

In general, the present invention relates to a microbead automatic recognition method and microbeads used in the microbead automatic recognition method. To put it in detail, the present invention relates to a microbead automatic recognition method for acquiring information on the rear/front and/or orientation of a microbead on the basis of the positions of a plurality of reference points created on the microbead in an operation to read a recognition pattern also created on the microbead and relates to microbeads used in the microbead automatic recognition method.

2. Description of the Related Art

In a biochemical analysis in the past carried out on an analysis subject such as nucleic acid or protein, a particle-state carrier referred to as a microbead is used. In a biochemical analysis in the past carried out on nucleic acid for example, a microbead having a probe nucleic-acid chain solidified on the surface of the microbead is used and, on the basis of interactions between the probe nucleic-acid chain having a base array complementary to a target nucleic-acid chain and the target nucleic-acid chain probe, the target nucleic-acid chain is separated. In a biochemical analysis in the past carried out on protein, on the other hand, a microbead having an antibody solidified on the surface of the microbead to serve as an antibody against a target protein is used to separate the target protein in the same way as the biochemical analysis in the past carried out on nucleic acid.

In recent years, in biochemical analyses each making use of these microbeads, an even higher throughput is demanded. In response to the demand, a technology for increasing the speed of the analysis has been developed.

For example, claim 23 described in Japanese Patent No. 3468750 (herein after referred to as Patent Document 1) states: "A method for detecting an analyte recognized by an analysis reactant of the analyte among a number of analytes in a sample, said method comprising the steps of:
(a): bringing a number of groups of fluorescent particles each having at least one nano-particle on the surface of said fluorescent particle and each labeled by its fluorescent dye into contact with said sample wherein said group includes fluorescent particles each having a fluorescent signal varying from group to group and an analysis reactant also varying from group to group and said analysis reactant is linked peculiarly to one analyte in said sample;
(b): adding said sample to a label reagent;
(c): analyzing said fluorescent particle showing that said analysis reactant is linked peculiarly to one analyte in said sample by detection of said label; and, at the same time,
(d): determining a group of said fluorescent particles linked to their respective analytes from a function of said varying fluorescent signal associated with one of said groups."

In accordance with Suspension Array Technology proposed by Luminex Corporation on the basis of the technology described above, a microbead is labeled with two types of fluorescent pigment by giving a change to the color of emitted light so that microbeads of up to 100 types can be recognized. In accordance with Suspension Array Technology, by solidifying a probe nucleic-acid chain peculiar to a microbead and an antibody peculiar to a microbead on the microbead of each of 100 different types, in one analysis, nucleic acids of 100 different types and proteins of 100 different types can be separated and detected.

Claim 25 described in Patent Document 1 states: "Each of said groups of said fluorescent particles is further determined by its size and shape." In addition, paragraph 0037 of Patent Document 1 states that each of the size and the shape can be used as an additional parameter for recognizing a microbead. In connection with this, "Multifunctional encoded particles for high-throughput bio-molecule analysis," Science 2007, Vol. 315, No. 5,817, p. 1,393-6 (herein after referred to as Non-Patent Document 1) discloses a method for creating a number of microbeads with shapes different from each other by adoption of a lithography technique on a flow path. In accordance with this method, it is possible to create microbeads with an extremely large number of shapes exceeding 1,000,000 types of shape.

SUMMARY OF THE INVENTION

Non-Patent Document 1 described above discloses a method for recognizing a microbead by reading a recognition pattern created on the microbead at a recognition-pattern detection section on a flow path after letting the microbead flow through the flow path and orienting the microbead in a proper direction.

In accordance with this method, however, in order for a microbead to pass through the recognition-pattern detection section on a flow path, it takes time of about ($\frac{1}{4}$) seconds. Thus, in order to recognize microbeads of 1,000,000 different types for example, it takes time of 250,000 seconds (or about 70 hours).

As is obvious from the description given above, the speed of an operation to read a recognition pattern created on the microbead may become a factor of importance to determination of the efficiency of a biochemical analysis which makes use of microbeads of an extremely large number of types.

Addressing the problem described above, the present invention have innovated a microbead automatic recognition method capable of recognizing a recognition pattern created on a microbead at a high speed.

In order to solve the problem described above, in accordance with the embodiment of the present invention, there is provided a microbead automatic recognition method including the steps of: acquiring an image of a circular surface of a cylindrical microbead having a recognition pattern created on the circular surface and a plurality of reference points also created on the circular surface; and acquiring information on the rear/front and/or orientation of the cylindrical microbead from the acquired image on the basis of the positions of the reference points.

The microbead automatic recognition method further includes a step of carrying out a pattern-matching process of determining whether or not the recognition pattern in the image matches a lattice used for detecting the recognition pattern by rotating the lattice on the basis of the information.

By acquiring information on the rear/front and/or orientation of a cylindrical microbead on the basis of positions at which the reference points are located on the circular surface and by carrying out a pattern-matching process of determining whether or not the recognition pattern matches a lattice, the recognition pattern can be detected by carrying out only few operations.

In accordance with the microbead automatic recognition method, each of two of the aforementioned reference points is located on the circumference of one of two concentric circles sharing a common center with the circular surface and having diameters different from each other. In addition, the two reference points shall not be located on sharing a straight line which passes through the common center.

In addition, a cylindrical microbead according to the embodiment of the present invention is configured to have a circular surface on which a recognition pattern and a plurality of reference points are created. Information on the rear/front and/or orientation of the cylindrical microbead is obtained from an acquired image of the circular surface on the basis of the positions of the reference points.

In addition, in the cylindrical microbead according to the embodiment of the present invention:

each of two of the reference points is located on the circumference of one of two concentric circles sharing a common center with the circular surface and having diameters different from each other; and the two reference points shall not be located on sharing a straight line which passes through the common center.

In the present invention, the recognition pattern and each of the reference points are each created on a microbead to have a form determined in advance. The recognition pattern and each of the reference points can each be detected by making use general image recognition unit such as a CCD (Charge Coupled Device) camera or image analysis software. The shape and size of the recognition pattern and each of the reference points are by no means limited to a shape and a size which are prescribed in advance. The recognition pattern of a microbead has a form determined in advance and is used for individually recognizing the microbead. In the case of microbeads having recognition patterns identical with each other, the same recognition pattern is coincident with reference points of any particular one of the microbeads to provide recognition means used for uniquely recognizing the particular microbead.

In accordance with the present invention, a recognition pattern created on a microbead can be recognized at a high speed.

BRIEF DESCRIPTION OF THE DRAWINGS

FIG. 1 is a plurality of model diagrams each showing a microbead according to a first embodiment of the present invention;

FIG. 2 is a plurality of model diagrams each showing the top view of a recognition pattern created in a code area on the circular surface on the top of the microbead, FIG. 2A is a model diagram showing the top view of a recognition pattern created in a code area on the circular surface on the top of a microbead 1A, FIG. 2B is a model diagram showing the top view of a recognition pattern created in a code area on the circular surface on the top of a microbead 1B, FIG. 2C is a model diagram showing the top view of a recognition pattern created in a code area on the circular surface on the top of a microbead 1C;

FIG. 7 is a plurality of model diagrams to be referred to in description of image recognition processes carried out at steps S1 to S6 of the flowchart shown in FIG. 6 to serve as the flowchart representing the procedure of the microbead automatic recognition method according to the first embodiment of the present invention;

FIG. 8 is a plurality of model diagrams to be referred to in description of image recognition processes carried out at steps S7 to S11 of the flowchart shown in FIG. 6 to serve as the flowchart representing the procedure of the microbead automatic recognition method according to the first embodiment of the present invention;

DETAILED DESCRIPTION OF THE PREFERRED EMBODIMENTS

Figure 3:
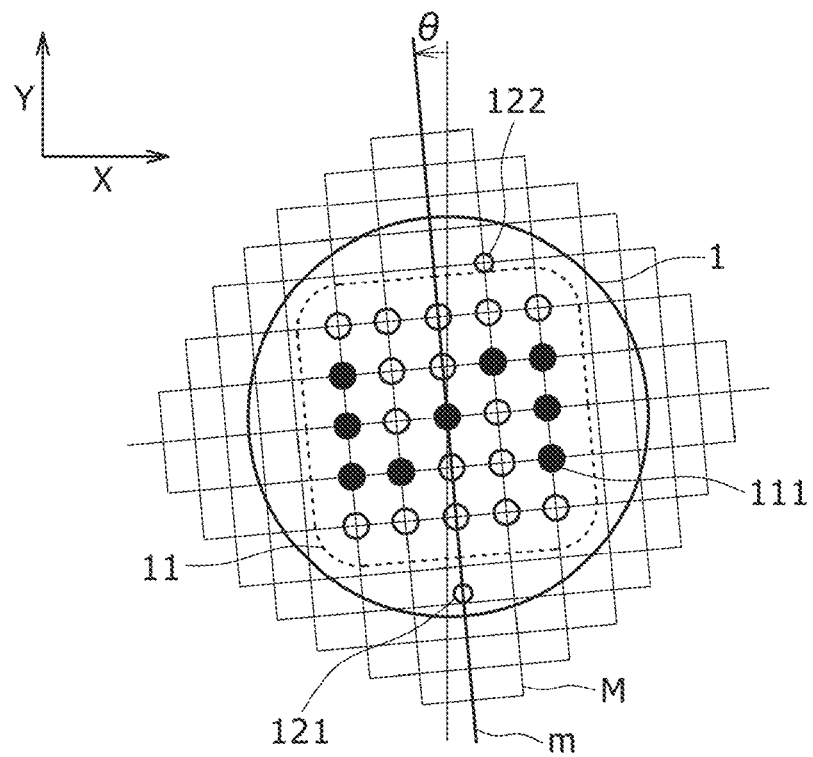
FIG. 3 is an explanatory model diagram to be referred to in description of a method for detecting a recognition pattern created in the code area.

Preferred embodiments of the present invention are described below by referring to diagrams. It is to be noted that the preferred embodiments described below are no more than representative implementations of the present invention and, thus, not to be interpreted as limitations on the present invention.

1: Microbeads (1) Microbeads of a First Embodiment

FIG. 1 is a plurality of model diagrams each showing a microbead according to a first embodiment of the present invention. To be more specific, FIG. 1A is a model diagram showing the top view of the microbead whereas FIG. 1B is a model diagram showing a side view of the microbead.

In the model diagrams of FIG. 1, reference numeral 1 denotes the microbead created to have a cylindrical shape which appears as a circle if seen from a position above or below the cylindrical microbead. The circular surface of the microbead 1 includes a code area 11 in which a recognition pattern used for identifying the microbead 1 is created. On a circumferential portion outside the code area 11, two reference points 121 and 122 are formed.

It is desirable to have precise circles as circular surfaces on the top of the cylindrical microbead 1 and the bottom thereof. However, completely circular surfaces on the top of the cylindrical microbead 1 and the bottom thereof are not really required. That is to say, approximate circular surfaces on the top of the cylindrical microbead 1 and the bottom thereof are sufficient as long as a process of automatically recognizing the microbead 1 in accordance with a microbead automatic recognition method to be described below can be carried out. It is desirable to create the microbead 1 to have a thickness d smaller than the diameter R of the circular surface, although it is not specified.

In addition, in the first embodiment, the code area 11 and the two reference points 121 and 122 are provided on the circular surface on the top of the microbead 1. However, the code area 11 and the two reference points 121 and 122 can be provided on the circular surface at the bottom of the microbead 1. That is to say, the code area 11 and the two reference points 121 and 122 can be provided on the circular surface on the top of the microbead 1 or the circular surface at the bottom thereof.

FIGS. 2A to 3C are a plurality of model diagrams each showing the top view of a recognition pattern created in a code area 11 on the circular surface on the top of the microbead 1.

In each of the model diagrams of FIGS. 2A to 2C, each of a plurality of black circles in the code areas 11 of the microbeads 1A, 1B and 1C respectively represents one of penetration holes 111 which go right through the microbeads 1A, 1B and 1C respectively from the top circular surfaces to the bottom circular surfaces. A penetration hole 111 can be created at any one of 25 locations at an intersection of one of 5 rows of a code matrix in the code area 11 and one of 5 columns of a code matrix. A penetration hole 111 created at such a location on a microbead 1 serves as a recognition code used for recognizing the microbead 1. A plurality of such penetration holes 111 on a microbead 1 form the so-called recognition pattern used for recognizing the microbead 1. That is to say, the distribution of the penetration holes 111 among the 25 locations for the microbead 1A is different from the distributions for the microbeads 1B and 1C, and the distributions for the microbeads 1B and 1C are different from each other. The unique distribution of the penetration holes 111 among the 25 locations on a microbead 1 forms a recognition pattern peculiar to the microbead 1 and is used for uniquely recognizing the microbead 1.

To put it concretely, in the microbead 1A shown in the model diagram of FIG. 2A, the penetration holes 111 are created at 9 of the 25 locations. In the model diagram of FIG. 2A, a black circle represents a location at which a penetration hole 111 is created whereas a white circle represents a location at which no penetration hole 111 is created.

By the same token, in the microbead 1B shown in the model diagram of FIG. 2B, the penetration holes 111 are created at 9 of the 25 locations. However, the 9 locations in the microbead 1B shown in the model diagram of FIG. 2B are different from the 9 locations in the microbead 1A shown in the model diagram of FIG. 2A. Thus, on the basis of the difference in locations at each of which a penetration hole 111 is created, the microbead 1A can be distinguished from the microbead 1B.

In addition, in the microbead 1C shown in the model diagram of FIG. 2C, the penetration holes 111 are created at 11 of the 25 locations. Thus, on the basis of the difference in location count representing the number of locations at each of which a penetration hole 111 is created, the microbead 1C can be distinguished from the microbead 1A and/or the microbead 1B.

The number of locations at each of which a penetration hole 111 is created can be any integer in the range 0 to 25. A penetration hole 111 can be created at any arbitrary location selected from the 25 locations. Since the location of a penetration hole 111 in a microbead 1 and the number of penetration holes 111 can be determined arbitrarily for the microbead 1, a recognition pattern unique to a microbead 1 can be created in the code area 11 of the microbead 1. By making use of image recognition means for detecting a recognition pattern which varies from microbead to microbead, as many different microbeads as the $25^{th}$ power of 2 can be recognized.

FIG. 3 is an explanatory model diagram referred to in description of a method for detecting a recognition pattern created in the code area 11. The figure shows an image taken by making use of ordinary image-taking means such as a CCD camera as an image of a circular surface of a microbead 1.

The recognition pattern in the taken image of a circular surface of a microbead 1 can be recognized by carrying out a pattern-matching process of determining whether or not the recognition pattern matches a lattice used for detecting the recognition pattern by rotating the lattice. In the explanatory model diagram of FIG. 3, the lattice is denoted by reference notation M.

The lattice M also referred to hereafter as a mesh M includes lattice lines intersecting each other at points each corresponding to a location at which a penetration hole 111 is created. If the lattice (or mesh) M is properly put on the image of a circular surface of a microbead 1 to overlap the code area 11, each of the intersections of the mesh M matches a location at which a penetration hole 111 is created. As described before, the location at which a penetration hole 111 is created is one of the 25 locations. The pattern-matching process of determining whether or not the recognition pattern of a microbead 1 matches the lattice M is a process of putting the mesh M on the image of a circular surface of the microbead 1 to overlap the code area 11 and determining whether or not a penetration hole 111 exists at an intersection of the mesh M for each intersection.

In order to place the mesh M on the image of a circular surface of a microbead 1 to overlap the code area 11, it is necessary to rotate the mesh M in accordance with the orientation of the microbead 1 on the image. In the case of the typical example shown in the explanatory model diagram of FIG. 3 for example, the image of a circular surface of the microbead 1 has been taken as an image showing the microbead 1 which is inclined from the Y axis by an inclination angle θ. In this case, the m axis of the mesh M is rotated by an angle equal to the inclination angle θ in the direction of inclination in order to carry out the pattern-matching process.

In order to recognize the recognition pattern at a high speed, it is necessary to carry out the processing to compute the inclination angle θ on the image of a circular surface of the microbead 1 and the processing to put the mesh M on the image to overlap the code area 11 while rotating the mesh M over the code area by the inclination angle θ in as few operations as possible.

The microbead 1 is provided with reference points 121 and 122 to form a configuration for computing the inclination angle θ on the image of a circular surface of the microbead 1.

Figure 4:
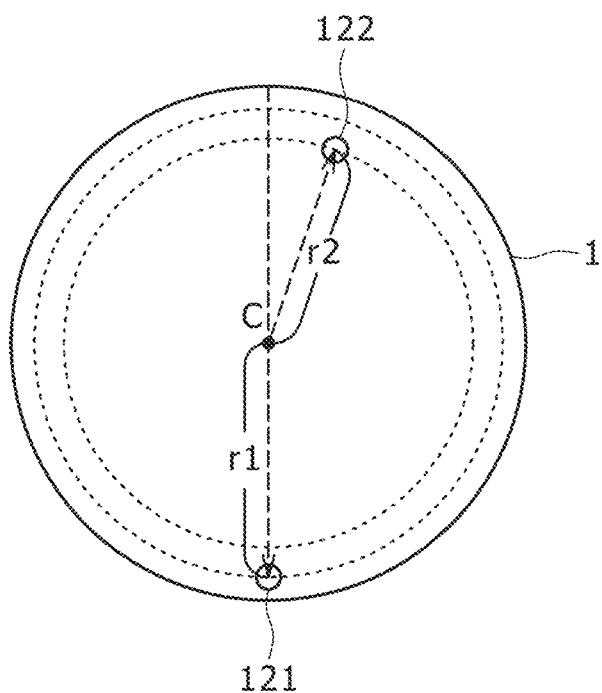
FIG. 4 is a model diagram showing the top view of a circular surface of the microbead as a top view including the locations of the two reference points in accordance with a first embodiment of the present invention.

FIG. 4 is a model diagram showing the top view of a circular surface of the microbead 1 as a top view including the locations of the reference points 121 and 122.

As described before, each of the reference points 121 and 122 is provided on a portion outside the code area 11 on the circular surface of the microbead 1 as also shown in the diagram of FIG. 1. Each of the reference points 121 and 122 can be provided at any arbitrary location as far as the location is in the portion outside the code area 11 on the circular surface of the microbead 1. In order to make the recognition of the recognition pattern in the code area 11 facilitate, however, it is desirable to create each of the reference points 121 and 122 in an outer circumferential area of the code area 11 in the circular surface.

The reference points 121 and 122 are located respectively on the circumferences of two concentric circles having the same common center C shared with the circular surface but radii different from each other. To put it concretely, in the typical example shown in the model diagram of FIG. 4, the reference point 121 is located at a point on an arc of a circle having the common center C as its center and a diameter of r1 whereas the reference point 122 is located at a point on an arc of a circle having the common center C also as its center and a diameter of r2 which is different from r1 (that is, r1≠r2).

In addition, the reference points 121 and 122 are located respectively at two positions existing on a straight line which does not pass through the common center C. That is to say, in the typical example shown in the model diagram of FIG. 4, a straight line connecting the reference points 121 and 122 to each other does not pass through the common center C. It is to be noted that each of the reference points 121 and 122 can be created to have any arbitrary shape and size.

(2) Microbeads of a Second Embodiment

Figure 5:
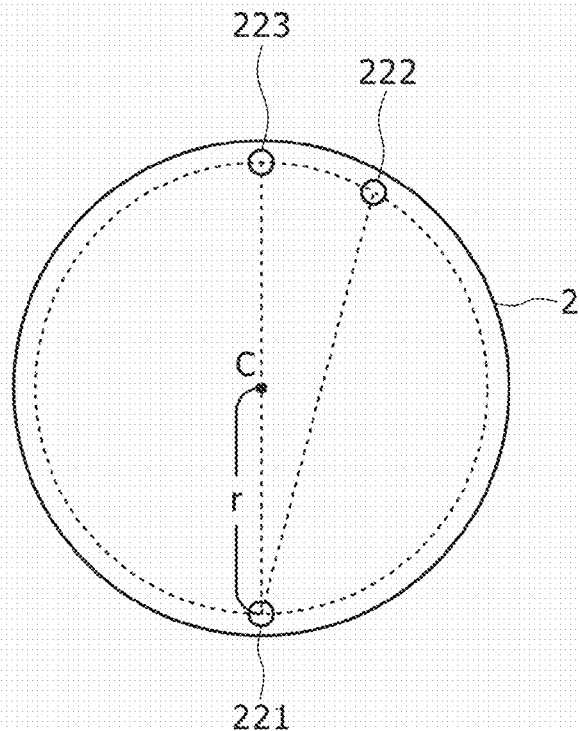
FIG. 5 is an explanatory model diagram showing the top view of a microbead according to a second embodiment of the present invention.

FIG. 5 is an explanatory model diagram showing the top view of a microbead according to a second embodiment of the present invention.

In the top-view model diagram of FIG. 5, reference numeral 2 denotes the microbead according to the second embodiment. The microbead 2 according to the second embodiment is different from the microbead 1 in that, in the case of the microbead 2, three reference points 221, 222 and 223 are created. Otherwise, the microbead 2 is similar to the microbead 1. For example, the shape of the entire microbead 2, the shape of the circular surface of the microbead 2, the code area 11 created in the circular surface and recognition codes created in the code area 11 are identical with those of the microbead 1.

The reference points 221, 222 and 223 on the microbead 2 are located on the circumference of a circle having the common center C shared with the circular surface of the microbead 2 and having a radius r. The reference points 221 and 223 are located on a straight line passing through the common center C. The reference point 222 is located at a position other than the 2 positions at which the reference points 221 and 223 are located respectively. That is to say, each of the reference points 221, 222 and 223 serves as a vertex of a triangle. For determining the rear or front of the microbead 2 as will be described later, however, it is necessary to place the reference points 221, 222 and 223 respectively at 3 locations each serving as one of vertexes that do not form an isosceles triangle.

Each of the reference points 221, 222 and 223 can be created to have any arbitrary shape and size. In addition, each of the reference points 221, 222 and 223 can be placed at any location as far as the location is in the portion outside the code area 11. In order to make the recognition of the recognition pattern in the code area 11 facilitate, however, it is desirable to create each of the reference points 221, 222 and 223 in an outer circumferential area of the code area 11 in the circular surface. The reference points 221, 222 and 223 can be created on the circular surface on the top of the microbead 2 or at the bottom thereof.

2: Microbead Automatic Recognition Method

Figure 6:
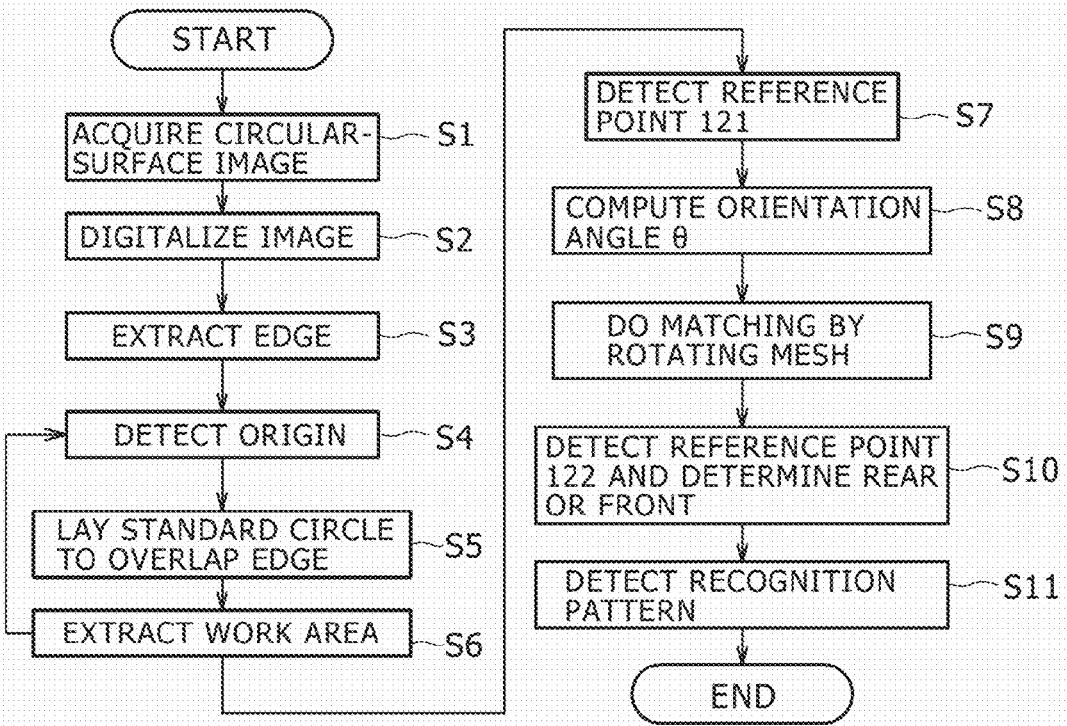
FIG. 6 shows a flowchart representing the procedure of a microbead automatic recognition method provided by an embodiment of the present invention to serve as a method for recognizing the microbead in accordance with the second embodiment of the present invention.

FIG. 6 shows a flowchart representing the procedure of a microbead automatic recognition method according to a first embodiment of the present invention to serve as a method for recognizing the microbead 1. FIGS. 7A to 7F and FIGS. 8A to 8D are a plurality of model diagrams referred to in description of image recognition processes carried out in FIG. 6.

(1) Acquisition of a Circular-Surface Image

First of all, the flowchart shown in FIG. 6 begins with a step S1 at which the microbead 1 is photographed by making use of ordinary photographing means such as a CCD camera in order to take an image of the circular surface of the microbead 1.

The microbead 1 has a shape resembling a cylinder. It is desirable to create the microbead 1 to have a thickness d smaller than the diameter R of the circular surface. That is to say, it is desirable to create the microbead 1 to have a shape resembling a disk like. By creating the microbead 1 to have a shape resembling a cylinder or a shape resembling a disk, the microbead 1 can be oriented in the vertical direction so that two circular surfaces of the microbead 1 are placed on the top of the microbead 1 and at the bottom thereof respectively. Thus, the image of the circular surface placed on the top of the microbead 1 can be taken with ease by photographing the microbead 1 from a position above the microbead 1 or the image of the circular surface placed at the bottom of the microbead 1 can be taken with ease by photographing the microbead 1 from a position beneath the microbead 1.

The image taken at the step S1 as the image of the circular surface of the microbead 1 is shown in the diagram of FIG. 7A. In actuality, as an example, the image taken at the step S1 shows the circular surfaces of two microbeads 1. The images of the circular surfaces of 2 microbeads 1 are denoted by reference notations B1 and B2 respectively.

(2) Conversion of the Image into Binary Values

Then, at the next step S2 of the flowchart shown in FIG. 6, each of the taken images is converted into binary values. By fetching any arbitrary color array or by re-computation from color information, each of the taken images is computed as a monochrome image. Then, each result of the computation is compared with a luminance level determined in advance as a threshold level, being converted into one of the two binary values of 0 and 1 in accordance with the result of the comparison. Each of the images converted into binary values at the step S2 is shown in the diagram of FIG. 7B. In each of the images shown in the diagram of FIG. 7B, the circular surface of each of the microbeads 1 is expressed by the binary value of 1 whereas a portion other than the circular surface of each of the microbeads 1 is expressed by the binary value of 0.

(3) Detection of Edges

Then, at the next step S3 of the flowchart shown in FIG. 6, every two adjacent points having luminance levels expressed by the binary value of 1 and the binary value of 0 respectively are identified in order to detect an edge (or a contour). An edge includes the contour of any one of a plurality of microbeads 1 on the photographing area and, in some cases, the contour of a noise such as a dust. The edges detected at the step S3 as the edges of the microbead circular-surface images B1 and B2 are shown in the diagram of FIG. 7C, being denoted by reference notations E1 and E2 respectively.

(4) Detection of an Origin

An image having a width of 'width' and a height of 'height' is transformed into a one-dimensional work array A. Thus, the size of the one-dimensional work array A is 'width'*'height.' Let the x axis represent a pixel count expressing the width whereas the y axis represent a pixel count expressing the height. In this case, a point with coordinates of (x, y) on the image is transformed into a point with a coordinate of (y*'width'+x) in the one-dimensional work array A in an operation to the image into the one-dimensional work array A. That is to say, in an operation to display the one-dimensional work array A on a 2-dimensional screen, the value of the (y*'width'+x)th element of the one-dimensional work array A is taken as the pixel value of the point with coordinates of (x, y) on the image.

Then, at the next step S4 of the flowchart shown in FIG. 6, the one-dimensional work array A is sequentially searched till a first pixel serving as the origin k is found. The origin k found in the search process carried out at the step S4 is denoted by reference notation k in the diagram of FIG. 7D. In this typical example, the point k on the edge E1 of the microbead circular-surface image B1 is detected in the search operation.

(5) Standard-Circle Overlapping

After the origin k has been detected, the flow of the procedure goes on to a step S5 of the flowchart shown in FIG. 6. At this step, the circumference E0 enclosing a standard circle and including the origin k is laid to overlap the edge E1. By laying the circumference enclosing a standard circle and including the origin k to overlap the edge E1, it is possible to determine whether the edge E1 is the contour of the circular surface of the microbead 1 or the contour of a noise such as a dust as will be described below.

Let a pixel count R represent the diameter of the circular surface of the microbead 1. There are 2 one-dimensional arrays each having R elements for the standard circle used in the circumference overlapping operation described above. The two one-dimensional arrays are an upside array Ru corresponding to the upper arc of the standard circle and a downside array Rd corresponding to the lower arc of the standard circle. The xth element in the upside array Ru has a coordinate of (sqrt (r*r−(x−R/2)*(x−R/2))+R/2) whereas the xth element in the downside array Rd has a coordinate of (−sqrt(r*r−(x−R/2)*(x−R/2))+R/2). The expression (sqrt(r*r−(x−R/2)*(x−R/2))+R/2) is the y coordinate of a point located on the upper arc which is tangent to the x and y axes as a point having the x coordinate whereas the expression (−sqrt(r*r−(x−R/2)*(x−R/2))+R/2) is the y coordinate of a point located on the lower arc which is tangent to the x and y axes as a point having the x coordinate. The upper arc tangent to the x and y axes is an arc in the first quadrant of the x-y coordinate plane whereas the lower arc tangent to the x and y axes is an arc in the second quadrant of the x-y coordinate plane.

Let the two-dimensional coordinates of every point on a circumference be transformed into a coordinate of a point on a one-dimensional array. In actuality, the circumference has an upper arc transformed into a one-dimensional upside array Ru and a lower arc transformed into a one-dimensional downside array Rd. The circumference has been placed in a two-dimensional coordinate system having a width of 'width' and a height of 'height.' A point p (px, py) in the two-dimensional coordinate system is taken as the origin O'. That is to say, the point p (px, py) is taken as the origin to be overlapped. As explained before, coordinates of (px, py) in the two-dimensional coordinate system are transformed into a coordinate of (py*'width'+px) in the one-dimensional array. In this case, a position with a coordinate in the range px to (px+R) in a one-dimensional array corresponds to a point located on the upper arc as a point having coordinates of (px, py+Ru[x−px]) or a point located on the lower arc as a point having coordinates of (px, py+Rd[x−px]), where reference notation Ru[x−px] denotes the value of an (x−px)th element of the one-dimensional upside array Ru whereas reference notation Rd[x−px] denotes the value of an (x−px)th element of the one-dimensional downside array Rd. That is to say, coordinates of (px, py+Ru[x−px]) on the upper arc are transformed into a coordinate of ((py+Ru[x−px])*width+px) in the one-dimensional upside array Ru whereas the coordinates of (px, py+Rd[x−px]) on the lower arc are transformed into a coordinate of ((py+Rd[x−px])*width+px) in the one-dimensional downside array Rd.

If a point on an edge E1 matches a point on the circumference E0 of the standard circle, the pixel at the position of the matching point has a value. If a point on an edge E1 does not match a point on the circumference E0 of the standard circle, on the other hand, the pixel at the position of the matching point does not have a value. For this reason, in the range px to (px+R) covering R points, the sum obtained by adding the values of pixels on the 2 arrays (that is, the one-dimensional upside array Ru and the one-dimensional downside array Rd) is computed in order to evaluate the state in which the edge E1 matches the circumference E0 of the standard circle. Therefore, by merely adding the values of pixels at positions on the upper and lower arcs, one determination for the positions on the circumference of a microbead can be carried out. As a result, the evaluation process can be simplified. Strictly speaking, the one determination for the positions on the circumference of a microbead is carried out by performing 2×R additions for R points on each of the upper and lower arcs. It is to be noted that, in the actual image recognition processing, a tolerance range of a certain degree is given to the evaluation value for the sum obtained as a result of the additions in order to eliminate effects of typically thin spots of the edge or the like.

The position of a pixel having the largest value among pixel values can be found in advance on the basis of the coordinates of the origin k and the pixel count R representing the diameter of the circular surface of the microbead. Thus, by determining whether or not the actual position of a pixel having the largest value among pixel values matches the pre-computed position of a pixel having the largest value among pixel values, it is possible to determine whether the edge E1 is the contour of the circular surface of a microbead or the contour of a noise such as a dust. To be more specific, if the actual position of a pixel having the largest value among saved pixel values is smaller than the position computed in advance on the basis of the pixel count R representing the diameter of the circular surface of the microbead as the position of a pixel having the largest value among pixel values, the origin k detected by using the one-dimensional work array A is determined to be not a point on the contour of the microbead 1, but a point on the contour of a noise such as a dust.

The circumference of the standard circle laid at the step S5 to overlap the edge E1 is shown as a dotted-line circumference denoted by reference notation E0 in the diagram of FIG. 7E.

As described above, since the circular surface of the microbead 1 is regarded as a surface having the shape of a precise circle and the operation to lay the standard circle to overlap the edge is carried out on the basis of a position computed in advance as the position of a pixel having the largest value among pixel values, the state of matching can be evaluated by performing few operations. If the photographing area of the microbead 1 is not a precise circle but a precise pentagon for example, however, the necessary processing to lay a standard polygon to overlap the edge increases considerably. It is thus desirable to provide the microbead 1 with a circular surface having the shape of a precise circle. It is to be noted, however, that the circular surface of the microbead 1 can have the shape of an approximate circle provided that the standard circle described above can be laid to overlap the edge of such a circular surface.

(6) Extraction of a Work Area

If the circumference E0 of the standard circle is laid to overlap the edge E1 and the edge E1 is determined to be the contour of the circular surface of the microbead 1, the flow of the procedure represented by the flowchart shown in FIG. 6 goes on to a step S6 at which an image area including the edge E1 is extracted as a work area. If the edge E1 is determined to be not the contour of the circular surface of the microbead 1, but the contour of a noise such as a dust, on the other hand, the flow of the procedure goes back to the step S4 at which the one-dimensional work array A is sequentially searched till the next origin is found.

(7) Detection of the Reference Point 121

After the execution of the step S6 has been completed, the flow of the procedure represented by the flowchart shown in FIG. 6 goes on to a step S7 at which the reference point 121 in the extracted work area including the edge E1 is detected. First of all, the work area is subjected to a binary conversion process adopting the method explained previously. In the binary conversion process, the recognition codes created in the code area 11 as well as the reference points 121 and 122 are inverted. An image obtained as a result of the binary conversion process is shown in the diagram of FIG. 8A. FIG. 8A is a diagram showing an image obtained as a result of the binary conversion process to set penetration holes 111 each serving as a recognition code as well as the reference points 121 and 122 at the binary value of 1 and other portions of the image at the binary value of 0.

A one-dimensional array (n) used for detecting the reference point 121 is obtained as a result of a process to transform a circle passing through the reference point 121 and having a radius of r1 into the array. The array has the same center as the array corresponding to the edge E1 (or the circumference E0 of the standard circle). The array is created by tracing the circumference of the circle in one direction (through 2×R points) and the values of the elements of the array are set at the same values of the elements of the array for the circumference E0 of the standard circle. (That is to say, the value of every element in the array is the value of a pixel at a point with coordinates of an R×R plane, that is a plane having a height of R and a width of R). Thus, the reference point 121 can be detected as the value of a pixel which is included in the work area as a pixel having a value showing the value of a certain element in the array.

The following description explains a typical case in which the reference point 121 is detected instead of detecting the reference point 122. In the following description, the reference point 121 is detected at this step S7 whereas the reference point 122 is detected at a step S10 to be explained later. However, the reference point 122 can be conversely detected at this earlier step S7 whereas the reference point 121 can be conversely detected at the later step S10. As an alternative, at the step S7, both the reference points 121 and 122 can be detected at the same time.

(8) Detection of the Orientation Angle θ

After the reference point 121 has been detected, the flow of the procedure represented by the flowchart shown in FIG. 6 goes on to a step S8. At the step S8, the orientation angle θ shown in the diagram of FIG. 8B as the orientation angle of the microbead 1 is computed. As shown in the diagram of FIG. 8, the orientation angle θ is an angle formed by the Y axis and a circular-surface diameter passing through the reference point 121.

(9) Mesh Rotation/Matching

Then, at the next step S9 of the flowchart shown in FIG. 6, the mesh M is rotated by the computed orientation angle θ in order to carry out a pattern-matching process of determining whether or not the recognition pattern matches the mesh M as shown in the diagram of FIG. 8C. The mesh M is rotated by rotating an axis m with the center of the microbead 1 taken as the center of the rotation by an angle obtained as a result of a computation based on cos θ and sin θ.

The pattern-matching process of determining whether or not the recognition pattern matches the mesh M can also be carried out by sustaining the orientation of the mesh M and rotating the recognition codes and the code area 11 in which the recognition codes have been created. As described before, however, the processing to rotate the mesh M requires few operations in comparison with the processing to rotate the recognition codes and the code area 11. Thus, the processing to rotate the mesh M in order to perform the pattern-matching process of determining whether or not the recognition pattern matches the mesh M can be carried out at a higher speed than the processing to rotate the recognition codes and the code area 11.

(10) Detection of the Reference Point 122 and Determination of the Rear/Front By adoption of the same method as the method for detecting the reference point 121, at the next step S10 of the flowchart shown in FIG. 6, the reference point 122 is detected. In the process of detecting the reference point 122, a one-dimensional array obtained as a result of transforming the circumference of a circle having a diameter of r2 is used.

Then, the rear or front of the microbead 1 is determined on the basis of a relation between the detected positions of the reference points 121 and 122. To put it concretely, the rear or front of the microbead 1 is determined by determining whether the reference point 121 is located at a position in the same half-circle side of the axis m as the position of the reference point 122 or a position in the half-circle side other than the half-circle side on which the reference point 122 is located as shown in the diagram of FIG. 8D.

(11) Detection of the Recognition Pattern

Finally, the procedure represented by the flowchart shown in FIG. 6 goes on to the last step S11 at which a recognition pattern is detected by determining whether or not a penetration hole 111 exists at each intersection of mesh lines in the mesh M.

As described above, in accordance with the microbead automatic recognition method according to the first embodiment of the present invention, on the basis of the positions of two reference points provided on a circular surface of a microbead 1 created to have the shape of a cylinder, the recognition codes of the microbead 1 can be detected by carrying out few operations so that the microbead automatic recognition method can be executed at a high speed.

In addition, since the reference points can be provided in a circumferential area external to the code area 11 of the circular surface of the microbead 1, the code area 11 can be made broader. As a result, a larger number of different code patterns can be created in the code area 11.

3: Microbead Automatic Recognition Method

Figure 9:
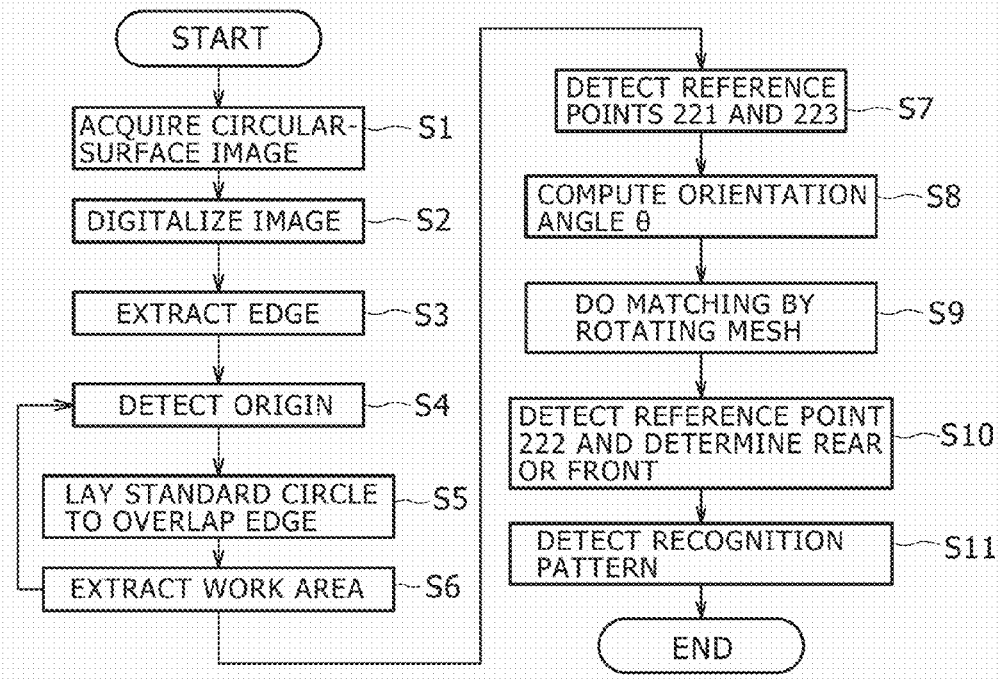
FIG. 9 shows a flowchart representing the procedure of a microbead automatic recognition method provided by the embodiments of the present invention to serve as a method for recognizing a microbead in accordance with the second embodiment of the present invention.

FIG. 9 shows a flowchart representing the procedure of a microbead automatic recognition method according to a second embodiment of the present invention to serve as a method for recognizing the microbead 2 according to the second embodiment. FIG. 10 is a plurality of model diagrams referred to in description of image recognition processes carried out at steps of the flowchart, which is shown in FIG. 9 to serve as the flowchart representing the procedure of the microbead automatic recognition method according to the second embodiment of the present invention, after a work area has been extracted.

Figure 10A:
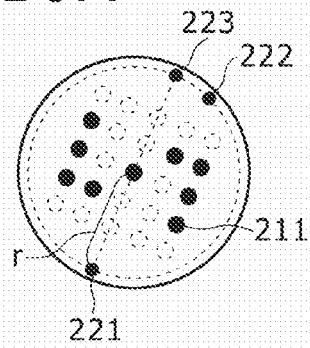
FIG. 10 is a plurality of model diagrams to be referred to in description of image recognition processes carried out at steps S7 to S11 of the flowchart shown in FIG. 9 to serve as the flowchart representing the procedure of the microbead automatic recognition method for recognizing the microbead according to the second embodiment of the present invention.
Figure 10B:
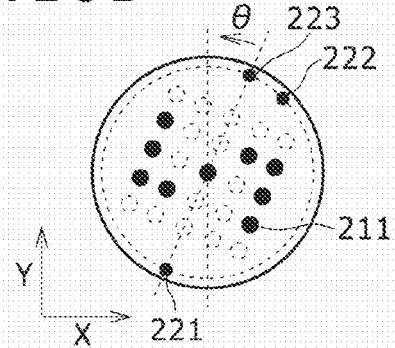

Steps S1 to S6 of the flowchart shown in FIG. 9 to represent a method for recognizing the microbead 2 are carried out in the same way as the steps S1 to S6 of the flowchart shown in FIG. 6 to serve as the flowchart representing the procedure of the microbead automatic recognition method provided for the microbead 1. Then, at a step S7 of the flowchart shown in FIG. 9, the reference points 221 and 223 in the extracted work area are detected. First of all, the work area is subjected to a binary conversion process adopting the method explained previously. In the binary conversion process, the recognition codes created in the code area 11 as well as the reference points 221, 222 and 223 are inverted. An image obtained as a result of the binary conversion process is shown in the diagram of FIG. 10A. FIG. 10A is a diagram showing an image obtained as a result of the binary conversion process to set penetration holes 211 each serving as a recognition code as well as the reference points 221, 222 and 223 at the binary value of 1 and other portions of the image at the binary value of 0.

A one-dimensional array (n) used for detecting the reference points 221 and 223 is obtained as a result of a process to transform a circle passing through the reference points 221 and 223 and having a radius of r into the array. In the case of the microbead 2, the reference points 221, 222 and 223 are located on the circumference of same circle. Thus, in actuality, the reference point 222 is also detected as well. Since the reference points 221 and 223 are placed on a straight line passing through the center of the circle, however, the reference points 221 and 223 can be fetched from the detected reference points 221, 222 and 223. In the following description, the reference points 221 and 223 are detected at this step S7 whereas the reference point 222 is detected at a step S10 to be explained later. As an alternative, at the step S7, all the reference points 221, 222 and 223 can be detected at the same time.

After the reference points 221 and 223 have been detected, the flow of the procedure represented by the flowchart shown in FIG. 9 goes on to a step S8. At the step S8, the orientation angle θ shown in the diagram of FIG. 10B as the orientation angle of the microbead 2 is computed.

Figure 10C:
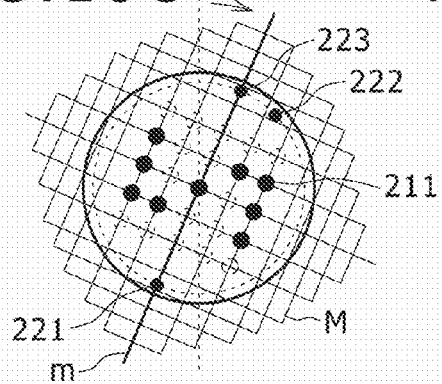

Then, at the next step S9 of the flowchart shown in FIG. 9, the mesh M is rotated by the computed orientation angle θ in order to carry out a pattern-matching process of determining whether or not the recognition pattern matches the mesh M as shown in the diagram of FIG. 10C. The mesh M is rotated by rotating an axis m with the center of the microbead 2 taken as the center of the rotation by an angle found as a result of a computation based on cos θ and sin θ.

Figure 10D:
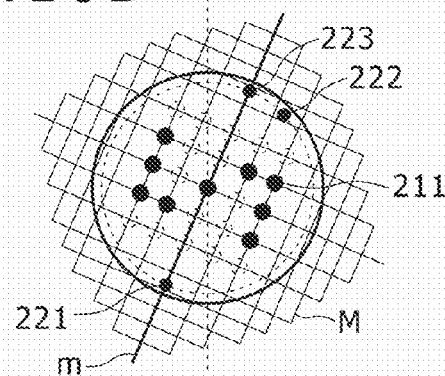

Then, at the next step S10 of the flowchart shown in FIG. 9, the reference point 222 is detected. In addition, the rear or front of the microbead 2 is determined on the basis of a relation between the detected position of the reference point 222 and the detected position of the reference point 221 as well as a relation between the detected position of the reference point 222 and the detected position of the reference point 223. To put it concretely, the rear or front of the microbead 2 is determined by determining whether the reference point 222 is located at a position in the right half-circle side of the axis m with respect to the position of the reference point 221 or a position in left half-circle side of the axis m with respect to the position of the reference point 221 as shown in the diagram of FIG. 10D.

If the reference points 221, 222 and 223 are placed respectively at three locations each serving as one of vertexes that form an isosceles triangle, the rear or front of the microbead 2 can be determined on the basis of a relation between the detected position of the reference point 222 and the detected position of the reference point 221 as well as a relation between the detected position of the reference point 222 and the detected position of the reference point 223.

Finally, the procedure represented by the flowchart shown in FIG. 9 goes on to the last step S11 at which a recognition pattern is detected by determining whether or not a penetration hole 211 exists at each intersection of mesh lines in the mesh M as explained before.

As described above, in accordance with the microbead automatic recognition method according to the second embodiment of the present invention, on the basis of the positions of three reference points provided on a circular surface of a microbead 2 created to have the shape of a cylinder, the recognition codes of the microbead 2 can be detected by carrying out only few operations.

In accordance with the microbead automatic recognition method and the microbead which are provided by the present invention, a recognition pattern created on the microbead can be recognized at a high speed. Thus, the present invention contributes to a higher throughput and higher processing speed of each of a variety of biochemical analyses each making use of a microbead.

The present application contains subject matter related to that disclosed in Japanese Priority Patent Application JP 2008-121849 filed in the Japan Patent Office on May 8, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A microbead automatic recognition method comprising:
acquiring an image of a circular surface of a cylindrical microbead having a recognition pattern created on said circular surface and a plurality of reference points also created on said circular surface, each of two of said reference points located on a circumference of at least one of two concentric circles sharing a common center with said circular surface and having diameters different from one another, wherein said two reference points are not both located on a straight line which passes through said common center and the two concentric circles surround the recognition pattern; and
acquiring information on the rear/front and/or orientation of said cylindrical microbead from said acquired image on the basis of the positions of said reference points.

2. The microbead automatic recognition method according to claim 1, further comprising
carrying out a pattern-matching process to determine whether said recognition pattern in said image matches a lattice used for detecting said recognition pattern by rotating said lattice on the basis of said information.

3. The microbead automatic recognition method according to claim 2, wherein determining whether said recognition pattern in said image matches a lattice used for detecting said recognition pattern comprises determining whether a penetration hole of the recognition pattern exists at an intersection of the lattice for each intersection of the lattice.

4. The microbead automatic recognition method according to claim 2, further comprising detecting an arcuate edge of the recognition pattern from the acquired image of the circular surface of the cylindrical microbead.

5. The microbead automatic recognition method according to claim 4, further comprising detecting an origin of the recognition pattern from the acquired image of the circular surface of the cylindrical microbead, laying a standard circle including the origin to overlap the arcuate edge, and determining whether the arcuate edge substantially matches the standard circle.

6. The microbead automatic recognition method according to claim 5, further comprising detecting a first reference point of the plurality of reference points disposed on said circular surface and determining an orientation angle formed by a reference axis and a straight line passing through the first reference point and the common center of the two concentric circles.

7. The microbead automatic recognition method according to claim 6, further comprising rotating the lattice by the orientation angle and determining whether said recognition pattern in said image substantially matches the lattice.

8. The microbead automatic recognition method according to claim 7, further comprising detecting a second reference point of the plurality of reference points disposed on said circular surface, determining the rear or front position of the cylindrical microbead, and detecting the recognition pattern of the cylindrical microbead.

9. The microbead automatic recognition method according to claim 1, further comprising converting the acquired image of the circular surface of the cylindrical microbead having the recognition pattern and the plurality of reference points created on said circular surface to binary values.

10. A cylindrical microbead configured to have a circular surface on which a recognition pattern and a plurality of reference points are created, wherein information on the rear/front and/or orientation of said microbead can be obtained on the basis of the positions of said reference points, each of two of said reference points are located on a circumference of at least one of two concentric circles sharing a common center with said circular surface and having diameters different from each other; and said two reference points are not both located on a straight line which passes through said common center and the two concentric circles surround the recognition pattern.

11. The cylindrical microbead according to claim 10, wherein the recognition pattern comprises a code matrix including a grid having a plurality of rows and a plurality of columns.

12. The cylindrical microbead according to claim 10, wherein all of said plurality of reference points are located on the circumference of one of the concentric circles sharing a common center with said circular surface.

13. The cylindrical microbead according to claim 10, wherein no two of said plurality of reference points are located on the circumference of a single concentric circle sharing a common center with said circular surface.

* * * * *